US007783190B2

(12) United States Patent
Imamura (10) Patent No.: US 7,783,190 B2
(45) Date of Patent: Aug. 24, 2010

(54) IMAGE PICK-UP APPARATUS WITH A MULTI-AREA AF FUNCTION

(75) Inventor: Keiichi Imamura, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 602 days.

(21) Appl. No.: 11/646,032

(22) Filed: Dec. 27, 2006

(65) Prior Publication Data

US 2007/0160359 A1 Jul. 12, 2007

(30) Foreign Application Priority Data

Dec. 27, 2005 (JP) ............................. 2005-375059

(51) Int. Cl.
*G03B 7/00* (2006.01)
(52) U.S. Cl. ..................... 396/238; 396/239
(58) Field of Classification Search ......... 396/121–124, 396/161, 238, 239; 348/207.1, 207.11, 208.12, 348/345, 349, 353, 249, 350, 354; 250/201.2, 250/201.7
See application file for complete search history.

(56) References Cited

U.S. PATENT DOCUMENTS

| | | | | |
|---|---|---|---|---|
| 4,437,741 A * | 3/1984 | Sato | ............................ | 396/272 |
| 5,168,299 A * | 12/1992 | Taniguchi et al. | ............ | 396/123 |
| 5,235,428 A * | 8/1993 | Hirota et al. | ................. | 348/355 |
| 5,678,066 A * | 10/1997 | Sato | ............................. | 396/51 |
| 5,749,000 A * | 5/1998 | Narisawa | ..................... | 396/121 |
| 6,931,208 B2 * | 8/2005 | Nakata et al. | ................ | 396/123 |
| 7,006,692 B2 * | 2/2006 | Matsushima | ................. | 382/168 |
| 7,158,183 B1 * | 1/2007 | Ohta | ........................... | 348/364 |
| 7,415,201 B2 * | 8/2008 | Matsumoto | ................... | 396/106 |
| 2002/0012065 A1 * | 1/2002 | Watanabe | ..................... | 348/364 |
| 2003/0052985 A1 * | 3/2003 | Oya et al. | .............. | 348/333.02 |
| 2005/0052540 A1 * | 3/2005 | Nakami | .................... | 348/222.1 |
| 2005/0084137 A1 * | 4/2005 | Kim et al. | .................... | 382/115 |
| 2005/0206747 A1 * | 9/2005 | Shirakawa | ............... | 348/231.6 |
| 2008/0292298 A1 * | 11/2008 | Hirai | ........................... | 396/121 |

FOREIGN PATENT DOCUMENTS

| | | |
|---|---|---|
| JP | 2-120711 A | 5/1990 |
| JP | 8-9236 A | 1/1996 |
| JP | 10-68872 A | 3/1998 |

OTHER PUBLICATIONS

Japanese Office Action dated Sep. 9, 2009 (3 pages), and English translation thereof (5 pages), issued in counterpart Japanese Application Serial No. 2005-375059.

* cited by examiner

*Primary Examiner*—Melissa J Koval
*Assistant Examiner*—Warren K Fenwick
(74) *Attorney, Agent, or Firm*—Frishauf, Holtz, Goodman & Chick, P.C.

(57) ABSTRACT

In an image forming apparatus, the auto-focusing process and the photometry system may be coupled such that when a multi-area AF system is set, the setting of the auto-focusing areas of the multi-area AF system is performed in accordance with a selected photometry system. More specifically, when an average metering system is selected as the photometry system, nine AF areas are set such that the AF areas are distributed throughout the whole image. When a center-weighted metering system is selected as the photometry system, four AF areas are set in the vicinity of the middle of the image. When a spot metering system is selected as the photometry system, one AF area is set in the vicinity of the middle of the image.

20 Claims, 9 Drawing Sheets

AVERAGE METERING SYSTEM

FIG. 5B

MULTI-AREA AF SYSTEM

FIG. 6A

CENTER-WEIGHTED METERING SYSTEM

FIG. 6B

MULTI-AREA AF SYSTEM

FIG. 7A

SPOT METERING SYSTEM

FIG. 7B

MULTI-AREA AF SYSTEM

FIG. 8

MULTI-AREA AF SYSTEM

FIG. 9A
--PRIOR ART--

CENTER-WEIGHTED METERING SYSTEM

FIG. 9B
--PRIOR ART--

MULTI-AREA AF SYSTEM

IMAGE PICK-UP APPARATUS WITH A MULTI-AREA AF FUNCTION

CROSS-REFERENCE TO RELATED APPLICATIONS

This application is based on and claims the benefit of priority from the prior Japanese Patent Application No. 2005-375059, filed Dec. 27, 2005, the entire contents of which are incorporated herein by reference.

BACKGROUND OF THE INVENTION

1. Field of the Invention

The present invention relates to an image pick-up apparatus, a control method thereof, and a computer readable memory medium, and more particularly to an image pick-up apparatus having a multi-area AF function, a control method thereof, and a computer readable memory medium.

2. Description of the Related Art

Recently, digital cameras with a multi-area AF (Auto-Focus) function have become available.

With the multi-area AF function is for executing an AF process, plural AF areas are prepared, and one area is automatically selected from among the plural AF areas as an area in which the subject of the imaging is to be automatically focused on. For example, an AF area where a subject is closest to a user's location may be selected for the AF process.

In addition, digital cameras are available which are provided with an AE (Automatic Exposure) processing function, which measures the intensity of light to determine an appropriate exposure, and which automatically sets an appropriate aperture and shutter speed based on the determined exposure. Various techniques for measuring the intensity of light falling on a subject are used, such as an "average metering system", a "center-weighted metering system" and a "spot metering system". The "average metering system" is a photometry system used to measure the intensity of light falling on the entire are of an image. The "center-weighted metering system" is a photometry system used to measure the intensity of light falling on the middle portion of image data. That is, in the "center-weighted metering system", the metering area is set throughout the whole image, and more weight is given to image data in the vicinity of the middle of the image and less weight is given to image data in the other areas of the image when calculating the appropriate exposure. The "spot metering system" is a photometry system used to measure the intensity of light falling on a specific portion of image data.

In conventional techniques, there is no correlation between the AE process and the AF process. To solve a problem whereby the AE process and the AF process are executed respectively on different portions of a subject, a technique has been proposed in which the AE process and AF process are executed on areas of the subject coupled with each other (JP Hei8-9236 JP).

Figure 9A:
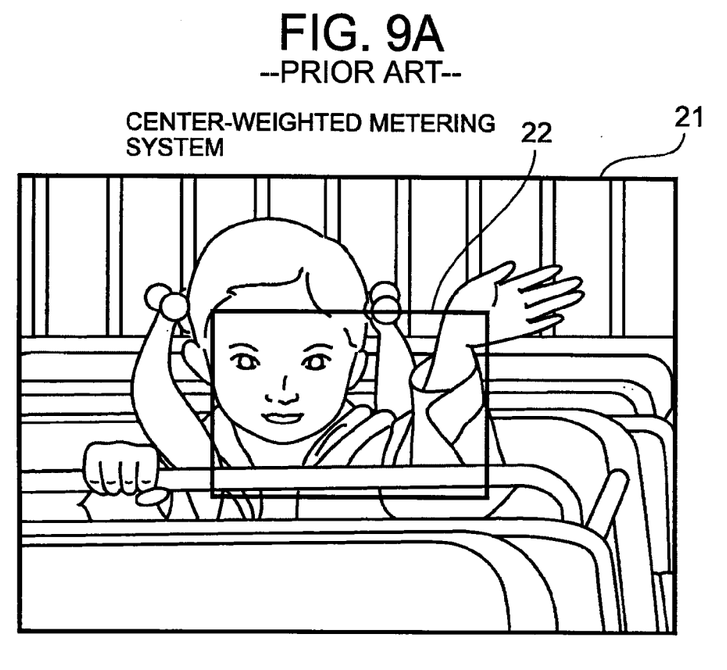
FIG. 9A is a view showing a metering area 21 and center-weighted area 22 for a conventional "center-weighted metering system"
Figure 9B:
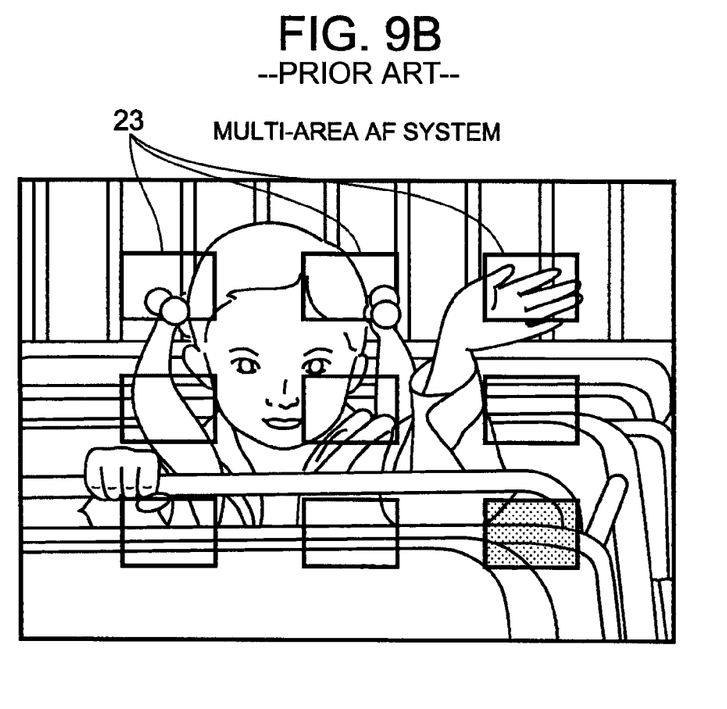
FIG. 9B is a view showing AF areas 23 for a conventional "multi-area AF system".

This technique, however, causes another problem. For example, in the case where the "multi-area AF system" is set, even if the user selects the "center-weighted metering system" because a subject (e.g., a girl shown in FIGS. 9A and 9B) to be photographed is located in the vicinity of the middle of an image as shown in FIG. 9A, a problem can be caused that another AF area (e.g., the stippled area in FIG. 9B) is focused on instead of an AF area in which the subject appears. In FIGS. 9A and 9B, numeral 21 denotes a metering area, 22 denotes a center-weighted area, and 23 denotes AF areas. In the "center-weighted metering system", the metering area 21 is set throughout the whole image, and the center-weighted area 22 indicates an area of the image which is located in the vicinity of the middle of the image, and which is given more weight. The technique disclosed by JP Hei8-9236 A cannot solve the problem caused when the "multi-area AF system" is set.

SUMMARY OF THE INVENTION

According to one aspect of the present invention, an image pick-up apparatus is provided which includes: an image pick-up unit which includes a focus lens and which photographs a subject to generate image data; a first selecting unit which is operable by a user to select a photometry system from among a plurality of photometry systems; a second selecting unit which is operable by the user to select an auto-focusing system from among a plurality of auto-focusing systems, including a multi-area auto-focusing system; an auto-focusing area setting unit which sets at least one auto-focusing area in accordance with the photometry system selected by the first selecting unit, when the multi-area auto-focusing system is selected by the second selecting unit; and a detecting unit which detects a focus position of the focus lens at which the subject is in focus, based on at least one portion of the image data generated by the image pick-up unit that falls within the at least one auto-focusing are set by the auto-focusing area setting unit.

According to another aspect of the present invention, a method is provided for controlling an image pick-up apparatus which includes an image pick-up unit which includes a focus lens and which is operable to photograph a subject to generate image data. The method includes: setting a photometry system selected by a user from among a plurality of photometry systems; setting an auto-focusing system selected by the user from among a plurality of auto-focusing systems, including a multi-area auto-focusing system; setting at least one auto-focusing area in accordance with the set photometry system, when the multi-area auto-focusing system is set; and detecting a focus position of the focus lens at which the subject is in focus, based on at least one portion of the image data generated by the image pick-up unit that falls within the at least one set auto-focusing area.

According to a further aspect of the invention, a computer readable storage medium is provided which has a computer program stored thereon that is executable by a CPU of an image pick-up apparatus which includes an image pick-up unit which includes a focus lens and which is operable to photograph a subject to generate image data, so as to cause the CPU to execute the processes of the method described above.

PREFERRED EMBODIMENTS OF THE INVENTION

Now, embodiments of a digital camera according to the present invention will be described in detail with reference to the accompanying drawings.

Figure 1A:
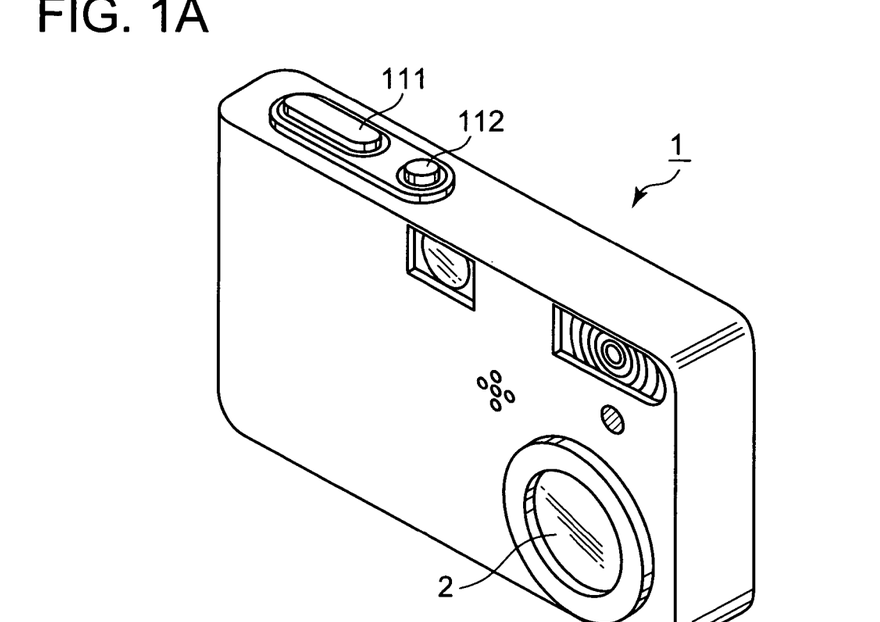
FIG. 1A is a front perspective view of an outer appearance of a digital camera 1, in which an embodiment of an image pick-up apparatus of the invention is used.
Figure 1B:
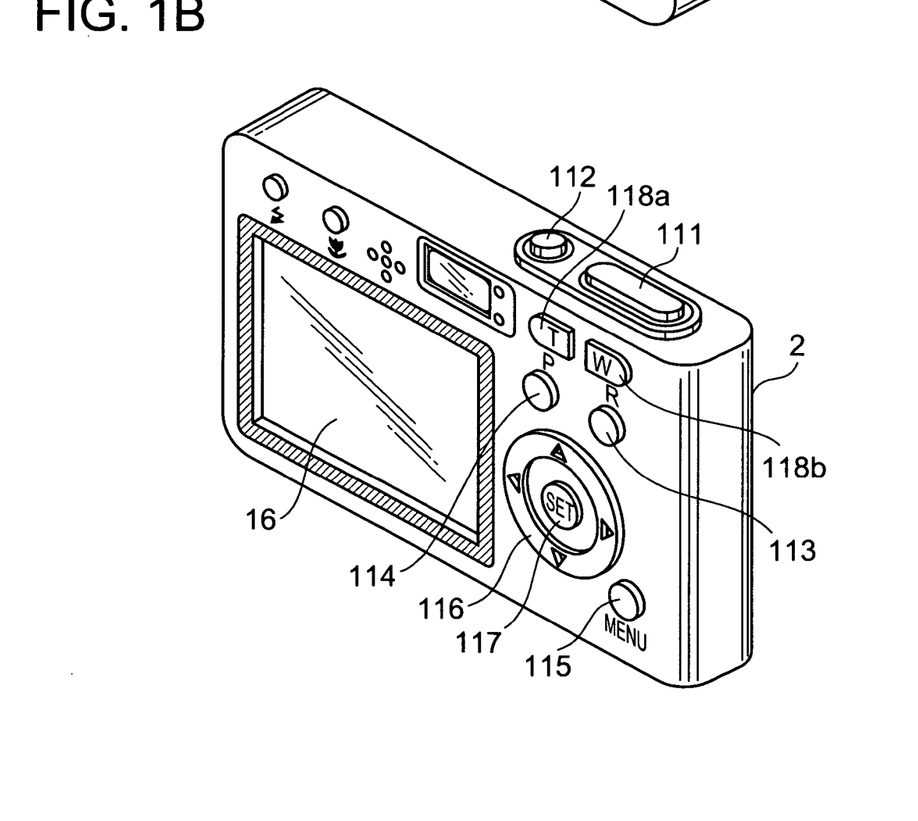
FIG. 1B is a rear perspective view of an outer appearance of the digital camera 1.

FIG. 1A and FIG. 1B are perspective views of an outer appearance of a digital camera 1 according to an embodiment of the present invention. FIG. 1A shows a front structure of the digital camera 1, and FIG. 1B shows a rear structure of the digital camera 1.

The digital camera 1 has a thin plate-shaped body having a substantially rectangular shape. An image pick-up lens 2 is provided in a front surface of the digital camera 1, and a shutter button 111, a power supply button 112, and so on are provided on a right edge side of an upper surface of digital camera 1, as viewed from a user side.

The shutter button 111 instructs photographing when a photographing operation is carried out. The power supply button 112 is operated to turn a power supply (not shown in detail) ON/OFF.

In addition, the digital camera 1 includes a photographing mode (R) key 113, a reproduction mode (P) key 114, a menu (MENU) key 115, a ring key 116, a set (SET) key 117, zoom key ("T" key 118a, "W" key 118b), and a display unit 16.

Figure 2:
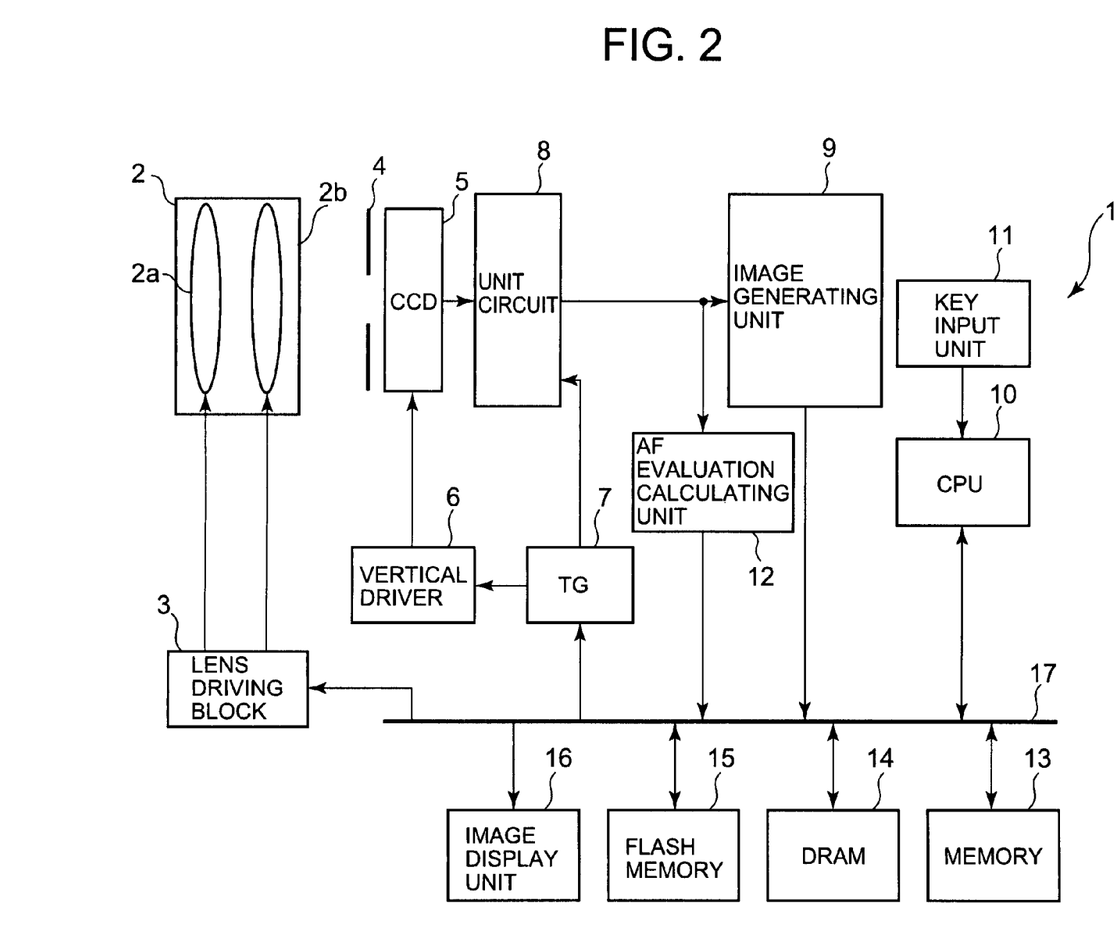
FIG. 2 is a block diagram of the digital camera 1.

FIG. 2 is a block diagram of a circuit configuration of the digital camera 1, in which the image pick-up apparatus of the present invention is put into practice.

The digital camera 1 includes the image pick-up lens 2, a lens driving block 3, aperture/shutter mechanism 4, CCD 5, vertical driver 6, TG (timing generator) 7, unit circuit 8, image generating unit 9, CPU 10, key input unit 11, AF evaluation calculating unit 12, memory 13, DRAM 14, flash memory 15, image display unit 16 and bus 17.

In the digital camera 1, CCD is used as an image pick-up element, but it is apparent that a CMOS image sensor may be used in place of the CCD serving as the image pick-up element.

The image pick-up lens 2 includes a focus lens 2a and zoom lens 2b, each of which is formed by a lens group. The lens driving block 3 is mechanically connected to the image pick-up lens 2. The lens driving block 3 includes a focus motor for driving the focus lens 2a along its optical axis, a zoom motor for driving the zoom lens 2b along the optical axis, and a focus motor driver and zoom motor driver for driving the focus motor and zoom motor, respectively (the motors and motor drivers of the lens driving block 3 are not shown).

The aperture/shutter mechanism 4 includes a driving circuit (not shown), which operates the aperture/shutter mechanism 4 in accordance with a control signal sent from CPU 10. The aperture/shutter mechanism 4 has a function of an aperture and a function of a shutter in the digital camera 1.

The aperture is a mechanism for controlling an amount of light incident to CCD 5, and the shutter is a mechanism for controlling a time (exposure time) during which light is allowed to be incident to CCD 5. The exposure time for allowing light to be incident to CCD 5 varies in accordance with various shutter speeds. The exposure is determined based on a shutter speed, aperture value (f-number) and the like.

CCD 5 is scanned by the vertical driver 6, whereby a light intensity of each of RGB colors of a subject is photo-electrically converted every predetermined period of time to generate an image pick-up signal. The image pick-up signal is supplied to the unit circuit 8. Operation of the vertical driver 6 and unit circuit 8 is controlled by CPU 10 via TG 7.

The unit circuit is connected to TG 7, and includes a CDS (Correlated Double Sampling) circuit for executing a correlated double sampling process on the image pick-up signal transferred from CCD 5 and for holding the sampled image pick-up signal, an AGC (Automatic Gain Control) circuit for automatically controlling the gain of the sampled image pick-up signal, and an A/D converter for converting the image pick-up signal output from the AGC circuit into a digital image pick-up signal. The image pick-up signal output from CCD 5 and converted into the digital image pick-up signal in the unit circuit 8 is transferred to the image generating unit 9 and AF evaluation calculating unit 12.

The image generating unit 9 executes a gamma-correction process and white-balance process on the image data sent from the unit circuit 8, whereby a luminance color-difference signal (YUV data) is generated. The image data (the luminance color-difference signal generated in the image generating unit 9) is sent to CPU 10.

CPU 10 comprises a one-chip micro-computer, which has a function of executing a data compression/expansion process (for example, a process for compressing and/or expanding data in JPEG format or MPEG format), an AF process and an AE process. Further, CPU 10 controls operation of various units in the digital camera 1.

The key input unit 11 includes keys such as shutter button 111, photographing mode key R, reproduction mode key P, menu key 115, ring key 116, SET key 117 and zoom keys W and T. When the key input unit 11 is operated, an operation signal corresponding to the operated key is sent to CPU 10. The shutter button 111 can be operated half way and/or the full way.

When image data is generated by CCD 5 with the focus lens 2a held at a focus position in an auto-focus operation mode, AF evaluation calculating unit 12 derives high frequency components from the image data falling within AF area 23, and accumulates the derived high frequency components so as to obtain an AF evaluation value.

Memory 13 stores a control program for CPU 10 to control operation of various units, and various types of data. CPU 10 operates in accordance with the control program, which includes, for example, programs necessary for executing the AF process and the AE process.

DRAM 14 is used as a buffer memory for temporarily storing image data which is photographed by CCD 5 and sent to CPU 10, and is also used as a work memory.

Flash memory 15 is a recording storage for storing image data which is photographed or generated by CCD 5 and compressed by CPU 10.

The image display unit 16 includes a color LCD and a driver circuit. The image display unit 16 displays a through image of a subject generated by CCD 5 in a stand-by state for photography (i.e., in the photographing mode), and the image display unit 16 displays a recorded image read out from the flash memory 15 and expanded by CPU 10 in a recorded-image reproducing state (i.e., in the reproduction mode).

Next, operation of the digital camera 1 according to the embodiment of the present invention will be described with reference to flow charts shown in FIGS. 3 and 4.

When a user operates the photographing mode key of the key input unit 11 to set the photographing mode, CPU 10 causes CCD 5 to start a photographing operation, whereby image data (a luminance color difference signal generated by the image generating unit 9) is stored in the buffer memory (DRAM 14), and the image data (through image) stored in DRAM 14 is displayed on the image display unit 16 at step S1.

CPU 10 judges at step S2 whether or not the menu key 115 has been operated by the user. CPU 10 determines that the menu key 115 has been operated by the user when an operation signal generated in response to operation of the menu key 115 is sent from the key input unit 11.

Figure 3:
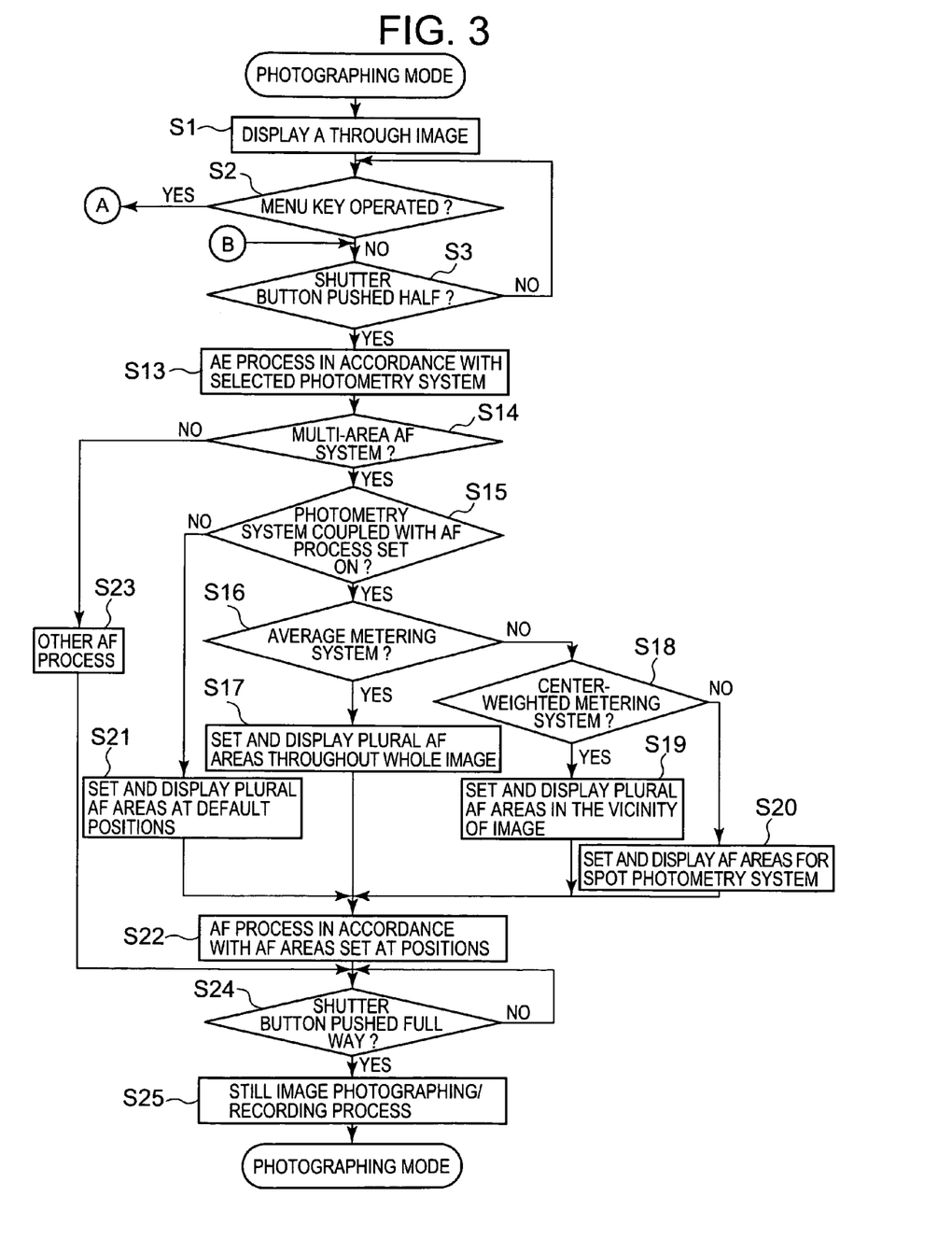
FIG. 3 is a flow chart of operation of the digital camera 1 according to the present invention.
Figure 4:
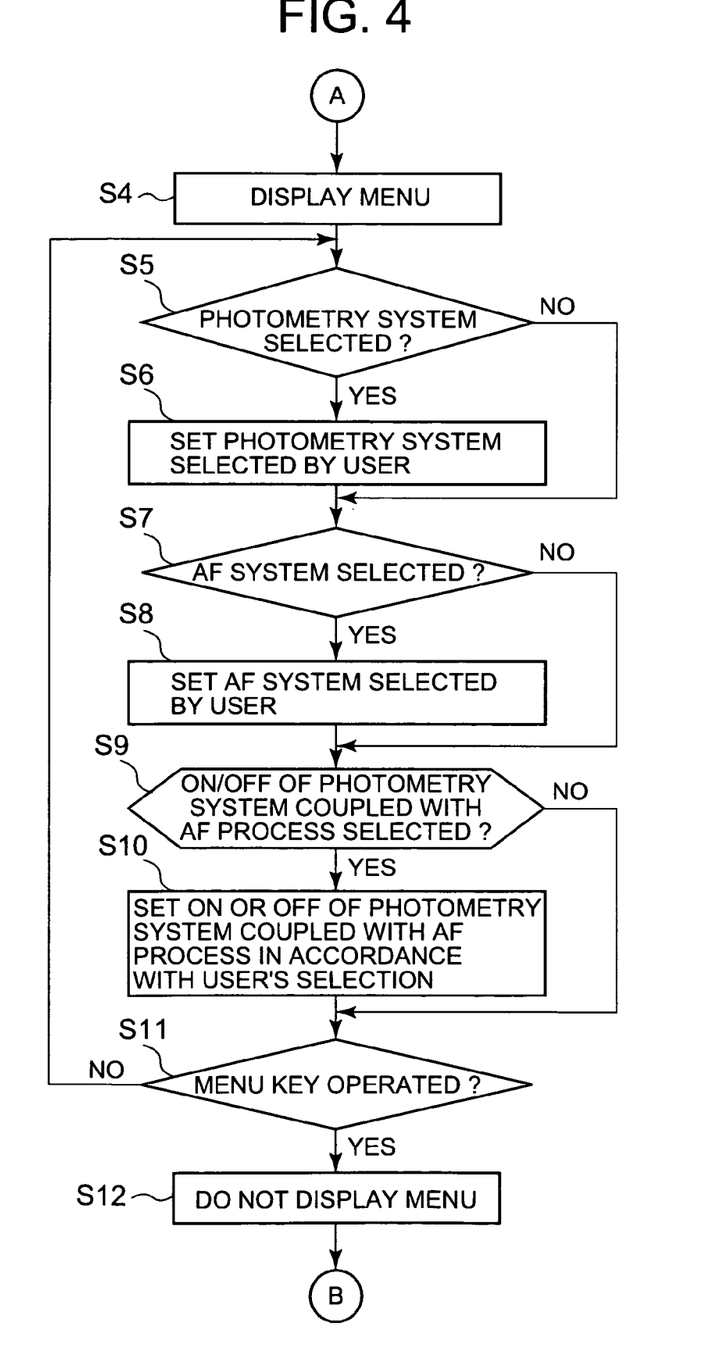
FIG. 4 is a flow chart of operation of the digital camera 1 according to the present invention.

Meanwhile, when it is determined at step S2 that the menu key 115 has been operated by the user (YES at step S2), CPU 10 advances to step S4 in FIG. 4, wherein CPU 10 causes the image display unit 16 to display a menu together with a through image of a subject. The displayed menu contains a field for selecting a photometry system, a field for selecting an AF system, and a field for selecting whether or not to couple the photometry system with the AF process.

Then, CPU 10 judges at step S5 whether or not the user has selected a photometry system by operating the ring key 116 and the SET 117 key of the key input unit 11.

More specifically, when the user operates the ring key 116 to move a cursor to the field for selecting a photometry system, CPU 10 displays plural types of photometry systems on the image display unit 16. When a photometry system is selected by operation of the ring key 116 and SET key 117, CPU 10 determines that the photometry system has been selected. According to one aspect of the present invention, three types of photometry systems are available for selection by the user, namely, the "average metering system", the "center-weighted metering system" and the "spot metering system".

When it is determined at step S5 that a photometry system has been selected by the user (YES at step S5), CPU 10 sets the selected photometry system at step S6. That is, CPU 10 stores information of the photometry system selected by the user in a photometry-system storing area of a built-in memory of CPU 10. Then, CPU 10 advances to step S7.

Meanwhile, when it is determined at step S5 that a photometry system has not been selected by the user (NO at step S5), CPU 10 advances directly to step S7.

At step S7, CPU 10 judges whether or not the user has selected an AF system by operating the ring key 116 and SET key 117 of the key input unit 11.

More specifically, when the user operates the ring key 116 to move the cursor to the field for selecting an AF system, CPU 10 displays plural types of AF systems on the image display unit 16. When an AF system is selected by operation of the ring key 116 and SET key 117, CPU 10 determines that an AF system has been selected. According to one aspect of the present invention, AF systems including a "multi-area AF system", a "face-recognition AF system", and a "free AF system" (which allows the user to set the AF area at an arbitrary area) are available for selection by the user.

When it is determined at step S7 that an AF system has been selected by the user (YES at step S7), CPU 10 sets the selected AF system at step S8. That is, CPU 10 stores information of the AF system selected by the user in an AF-system storing area of the built-in memory of CPU 10. Then, CPU 10 advances to step S9.

Meanwhile, when it is determined at step S7 that an AF system has not been selected (NO at step 7), CPU 10 advances directly to step S9.

At step S9, CPU 10 judges whether or not the user has selected whether to turn coupling of the photometry system and the AF process ON or OFF by operating the ring key 116 and SET key 117 of the key input unit 11.

More specifically, when the user operates the ring key 116 to move the cursor to the field for selecting whether to couple the photometry system with the AF process, CPU 10 displays two options, one (ON) for turning ON coupling of the photometry system with the AF process and the other (OFF) for turning OFF coupling (or not selecting coupling) of the photometry system with AF the process, on the image display unit 16. When coupling of the photometry system with the AF process is turned ON or OFF by operation of the ring key 116 and SET key 117, CPU 10 determines that coupling of the photometry system with the AF process has been has been turned ON or OFF.

When it is determined at step S9 that the user has selected whether or not the photometry system is coupled with the AF process (YES at step S9), at step S10 CPU 10 sets coupling of the photometry system with the AF process ON or OFF in accordance with the selection of the user 0. That is, CPU 10 stores information indicating whether coupling of the photometry system with the AF process is ON or OFF in a coupled-system information storing area of the built-in memory of CPU 10. Then, CPU 10 advances to step S11.

Meanwhile, when it is determined at step S9 that the user has not selected whether or not the photometry system is coupled with AF process (NO at step S9), CPU 10 advances directly to step S11.

At step S11, CPU 10 judges whether the user has operated the menu key 116 or not. When it is determined at step S11 that the menu key has not been operated by the user (NO at step S11), CPU 10 returns to step S5. When it is determined at step S11 that the menu key has been operated by the user (YES at step S11), CPU 10 ends the display of the menu on the image display unit 16 at step S12, and advances to step S3 in FIG. 3.

Thus, while the menu is displayed on the image display unit 16, the user is allowed to select a field corresponding to any of a photometry system, an AF system, and coupling of the photometry system with the AF process, and to change the setting of the selected field at his or her discretion.

Returning to FIG. 3, when it is determined at step S2 that the menu key 115 has not been operated (NO at step S2), CPU 10 advances to step S3. In addition, following step S12 in FIG. 4, CPU 10 advances to step S3.

At step S3 the CPU 10 judges whether or not the shutter button 111 has been half-pushed. CPU 10 determines that the shutter button 111 has been half-pushed when an operation signal generated in response to a half-push operation of the shutter button 111 is sent from the key input unit 11.

When it is determined at step S3 that the shutter button 111 has not been half-pushed (NO at step S3), CPU 10 returns to step S2. When it is determined at step S3 that the shutter button 111 has been half-pushed (YES at step S3), CPU 10 advances to step S13. (As described above, the user is permitted to select a photometry system and/or an AF system, as well as whether to couple the photometry system and AF process, by operating the menu key 116 before half-pushing the shutter button 111).

At step S13, CPU 10 executes an AE process in accordance with the previously set photometry system. That is, CPU 10 executes a photometry process based on a luminance component Y of image data in a metering area corresponding to the previously set photometry system, and the CPU 10 calculates an exposure value based on the result of the photometry process. Then, CPU 10 determines an aperture value (f-number) and shutter speed so as to ensure the calculated exposure value.

More specifically, when the "average metering system" is set as the photometry system, the metering area 21 is set to encompass the whole area of the image, and the exposure value is calculated based on a luminance component of an average value of the image data from the entire area of the image.

When the "center-weighted metering system" is set, the metering area 21 is set to encompass the whole area of the image, but image data in the vicinity of the center of the image is given more weight while image data in the other area of the image is given less weight. An average value of the image data weighted in this manner is calculated, and the exposure value is calculated based on a luminance component of the calculated average value of the image data. Note that the exposure value can also be calculated based on only a luminance component of image data in the vicinity of the center of the photographed image.

When the "spot metering system" is set, the metering area 21 is set to encompass a partial area of the image data, and the exposure value is calculated based on a luminance component of the partial area of the image data.

Then, CPU 10 judges at step S14 whether or not the "multi-area AF system" has been set as the AF system based on the information stored in the AF-system storing area of the built-in memory of CPU 10.

When it is determined at step S14 that the "multi-area AF system" has been set (YES at step S14), CPU 10 judges at step S15 whether or not coupling of the photometry system with the AF process has been turned ON based on information stored in the coupled-system information storing area of the built-in memory of CPU 10.

When it is determined at step S15 that coupling of the photometry system with the AF process has been turned ON (YES at step S15), CPU 10 judges at step S16 whether or not the "average metering system" has been selected based on information stored in the photometry-system storing area of the built-in memory of CPU 10.

When it is determined at step S16 that the "average metering system" has been set (YES at step S17), CPU 10 sets the number of AF area 23 to a default number "9", and sets positions of the AF areas 23 such that the nine AF areas 23 are arranged throughout a whole image generated by CCD 5. CPU 10 displays the plural AF areas on the image display unit 16 in accordance with the previously set positions at step S17, and advances to step S22.

The number and positions of AF areas 23 (referred to as "area information" for the AF areas 23) to be set when the "average metering system" is set are previously recorded in the memory 13, and CPU 10 reads out the area information from the memory 13, and sets the number and positions of AF areas 23, whereby plural AF areas 23 are displayed on the image display unit 16. In the present embodiment, each AF area has a predetermined width.

Figure 5A:
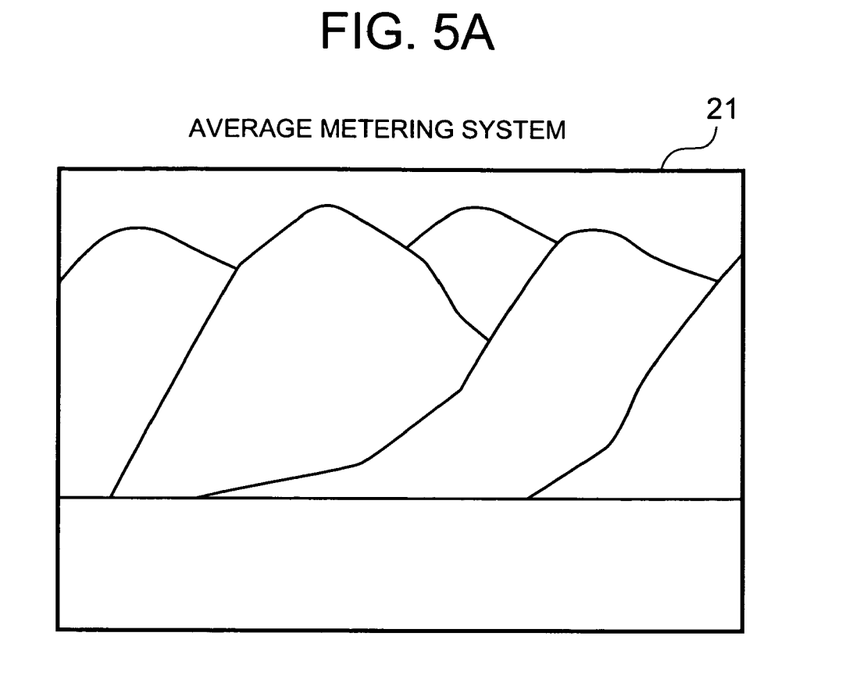
FIG. 5A is a view showing a metering area 21 set when an "average metering system" is selected.

FIG. 5A is a view showing an image displayed on the image display unit 16 when the "average metering system" has been set, wherein the metering area 21 covers the whole area of image data generated by CCD 5.

Figure 5B:
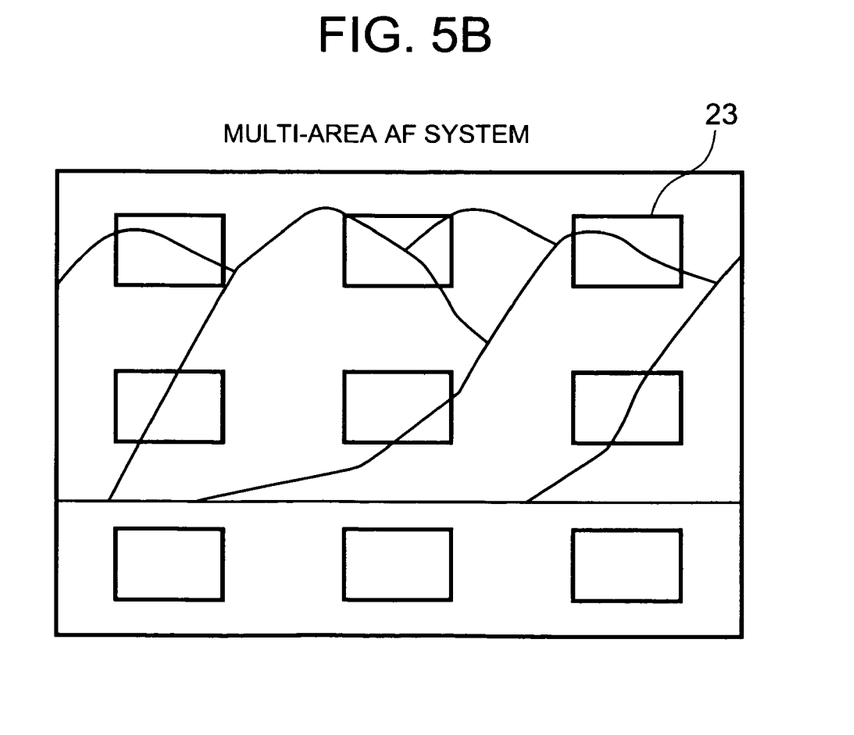
FIG. 5B is a view showing AF areas 23 set for the "average metering system" when a "multi-area AF system" is selected.

FIG. 5B is a view showing an image displayed on the image display unit 16 when the "average metering system" and "multi-area AF system" have been set, wherein plural AF areas 23 for the "average metering system" are displayed (step S17).

As shown in FIG. 5B, plural AF areas are arranged throughout the whole image displayed on the image display unit 16.

In general, when the user selects the "average metering system", the user's desired subject is represented throughout the whole area of the image. Accordingly, inconvenience is not caused for the user if one portion of the image comes into focus. Therefore, plural AF areas 23 are arranged throughout the whole image.

When the "average metering system" is set, since the metering area 21 covers the whole area of image data, the exposure value is calculated based on a luminance component of the whole image data, and the aperture value (f-number) and shutter speed are calculated based on the calculated exposure value in the AE process at step S13.

Meanwhile, when it is determined at step S16 that the "average metering system" has not been selected (NO at step S16), CPU 10 judges at step S18 whether or not the "center-weighted metering system" has been set. The judgment is made based on information of the photometry system stored in the photometry-system storing area of the built-in memory of CPU 10.

When it is determined at step S18 that the "center-weighted metering system" has been set (YES at step S18), CPU 10 sets the number of AF areas to "4", which is smaller than the number of AF areas for the "average metering system", and the CPU 10 sets the positions of the four AF areas 23 in the vicinity of the center of an image of image data generated by CCD 5, and displays the AF areas on the image display unit 16 at step S19. Then, CPU 10 advances to step S22.

In this case, the number and positions of AF areas 23 (the "area information" for the AF areas 23) to be set when the "center-weighted metering system" is set are previously recorded in the memory 13, and CPU 10 reads out the area information from the memory 13, and sets the number and positions of AF areas 23, whereby plural AF areas 23 are displayed on the image display unit 16.

Figure 6A:
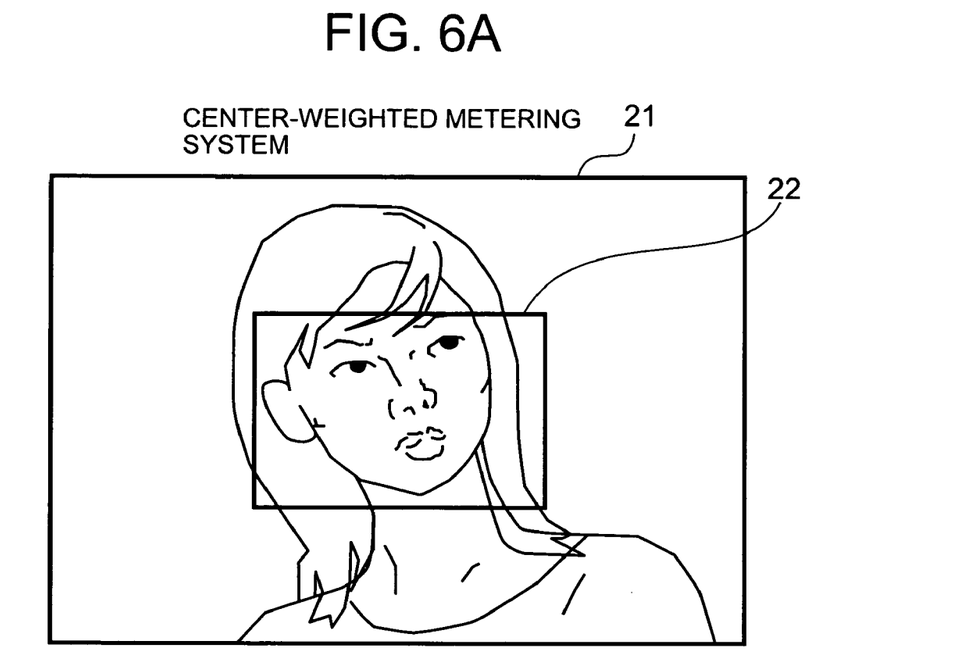
FIG. 6A is a view showing a metering area 21 and center-weighted area 22 set when a "center-weighted metering system" is selected.

FIG. 6A is a view showing a metering area 21 and center-weighted area 22 for photometry in the "center-weighted metering system", in which the center-weighted area 22 is set in addition to the metering area 21.

In the "center-weighted metering system", the metering area 21 covers the whole area of the image data generated by CCD 5, and image data in the vicinity of the middle of the whole image data is given more weight. The center-weighted area 22 defines an area of the image data to which more weight is given.

Figure 6B:
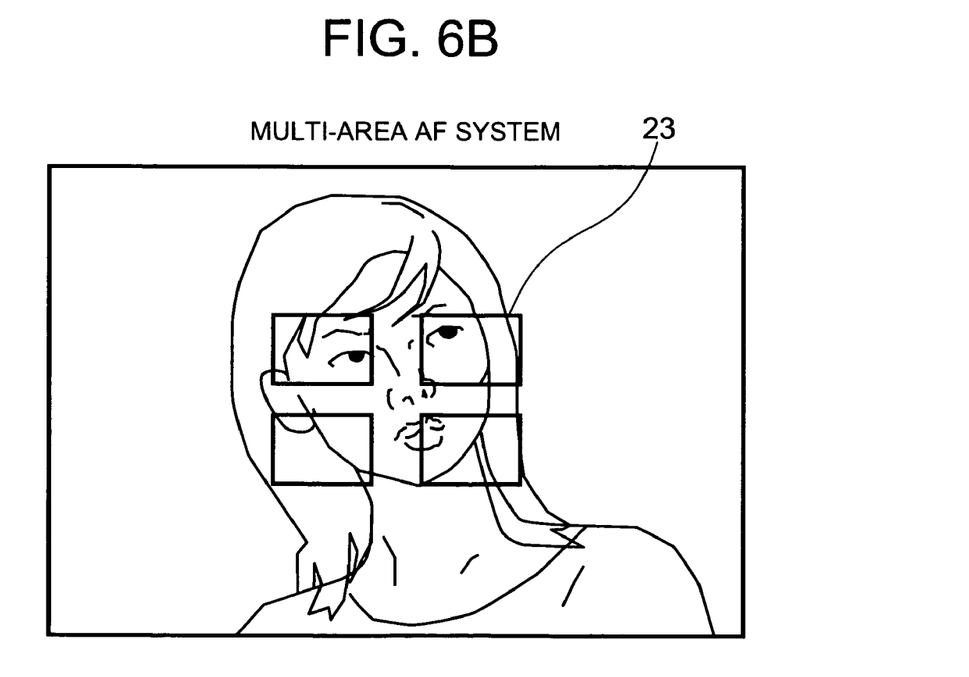
FIG. 6B is a view showing AF areas 23 set for the "center-weighted metering system" when the "multi-area AF system" is selected.

FIG. 6B is a view showing positions where AF areas 23 are displayed in the "center-weighted metering system", when the "center-weighted metering system" and "multi-area AF system" have been set (step S19).

In general, when the user selects the "center-weighted metering system", the user brings an image of his or her target subject close to the center of an image. Therefore, according to this embodiment of the present invention the number of AF areas 23 is decreased and the AF areas are concentrated in the vicinity of the middle of the image. Note that plural AF areas 23 may be disposed within the center-weighted area 22 or within an area which covers the center-weighted area 22 and which is slightly wider than the area 22. In short, any area will be acceptable for positioning the AF areas 23, if the is deemed to be substantially equivalent (substantially identical) to the center-weighted area 22.

As shown in FIG. 6B, four AF areas 23 are provided in the image, but another number of AF areas will be acceptable, if the AF areas are disposed within an area substantially equivalent to the "center-weighted area" 22.

When the "center-weighted metering system" has been set, the metering area 21 covers the whole image area, and, in the AE process at step S13, a portion of image data within the "center-weighted area" 22 is given more weight while the other portion of the image data (in an area other than the "center-weighted area" 22) is given less weight. Then, a luminance component of an average value of the weighted image data is detected, and an exposure value is calculated based on the detected luminance component, whereby an aperture value (f-number) and shutter speed are determined based on the calculated exposure value.

Meanwhile, when it is determined at step S18 that the "center-weighted metering system" has not been set (NO at step S18), CPU 10 determined that the "spot metering system" has been set. Then, CPU 10 sets the number of AF area 23 to "1", and sets a position of the AF area 23 such that the AF area 23 is included within the metering area 21 for the "spot metering system" or within an area substantially equivalent to the metering area 21, and the CPU 10 displays the AF area 23 at the set position in the image displayed on the image display unit 16 at step S20. Then, CPU 10 advances to step S22.

The number and position of AF area 23 (the "area information" for AF area 23) to be set when the "spot metering system" is set are previously stored in the memory 13. CPU 10 reads out the area information from the memory 13, and sets the number and position of AF area 23, whereby the AF area 23 is displayed in the image displayed on the image display unit 16.

Figure 7A:
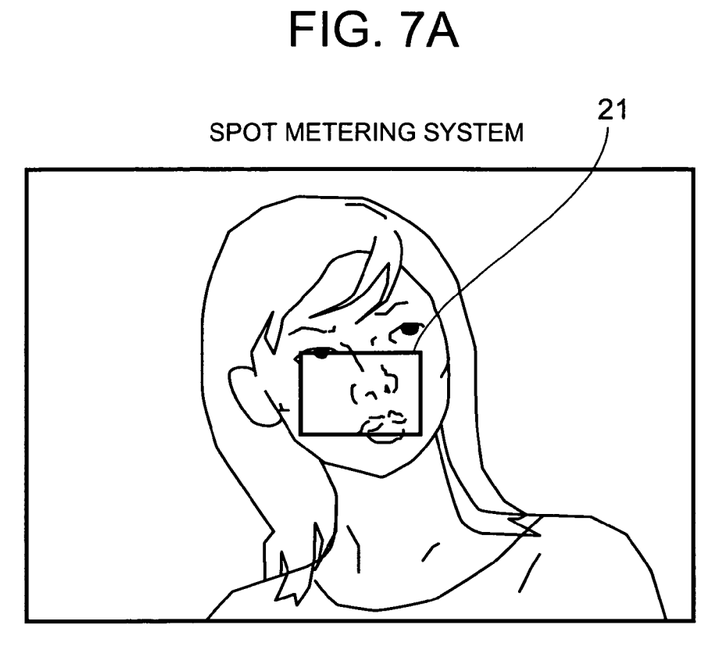
FIG. 7A is a view showing a metering area 21 set when a "spot metering system" is selected.

FIG. 7A is a view showing a metering area 21 in an image displayed on the image display unit 16 when the "spot metering system" has been set. As shown in FIG. 7A, the metering area 21 covers the middle portion of image data generated by CCD 5.

Figure 7B:
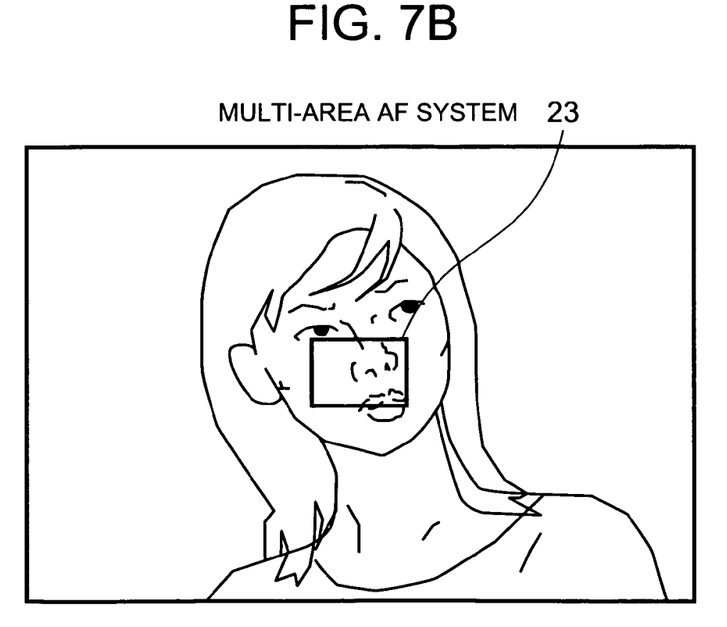
FIG. 7B is a view showing AF areas 23 set for the "spot metering system" when the "multi-area AF system" is selected.

FIG. 7B is a view showing a position at which AF area 23 for "the spot metering system" is set, when the "spot metering system" and "multi-area AF system" have been selected (step S20).

In general, when the user has selected the "spot metering system", the user pans the image pick-up apparatus to bring his or her target subject near to the middle of an image, and therefore, the AF area 23 is set close to the middle of the image. As shown in FIG. 7B, when the "spot metering system" is selected, the metering area 21 is narrow, and therefore plural AF areas 23 cannot be displayed within the narrow metering area 21. Accordingly, the number of the AF area 23 to be displayed is set to "1". Alternatively, if plural AF areas can be included within the metering area 21 (or an area substantially equivalent to the metering area 21), then plural AF areas may be acceptable and can be displayed.

In the present embodiment, the metering area 21 is set in the vicinity of the middle of the image, but when the user selects an arbitrary portion in the image as the metering area 21 for the spot metering system, the metering area 21 is changed to the selected portion of the image, and the AF area 23 is positioned so as to be displayed at a position included within the changed metering area 21.

Further, when the "spot metering system" has been selected, the metering area 21 is set to a portion in the image data, and in AE process at step S13, an exposure value is calculated based on a luminance component of the image data falling within the metering area 21. Then, an aperture value (f-number) and shutter speed are determined based on the calculated exposure value.

Meanwhile, when it is determined at step S15 that coupling of the photometry system with the AF process has been turned OFF (NO at step S15), CPU 10 sets positions of plural ("9") AF areas to the previously set default positions (for example, the positions of the AF areas shown in FIG. 9B), and the CPU 10 displays the plural AF areas at the preset positions at step S21. Then, CPU 10 advances to step S22.

At step S22, CPU 10 executes the AF process in accordance with a "contrast-detection system" based on the number and position of the AF areas determined and set at step S17, S10, S11 or S12. Then, CPU 10 advances to step S24.

More specifically, CPU 10 sends a control signal to the lens diving block 3, whereby the focus lens 2a is moved from a lens position at which the focus lens 2a comes into focus on a subject located closest to the user to a lens position at which the focus lens 2a comes into focus on a subject located farthest from the user (search movement). The CPU 10 obtains an AF evaluation value calculated by AF evaluation calculating unit 12 for each AF area, and the CPU 10 detects a peak value of the AF evaluation value of each AF area. The CPU 10 stops moving the focus lens 2a at a time when the peak value of any of the AF areas has been detected, and the CPU 10 holds the focus lens 2a at the position where the peak value has been detected, whereby the focus lens comes into focus on the subject.

Meanwhile, when it is determined at step S14 that the "multi-area AF system" has not been set (NO at step S14), CPU 10 executes an AF process at step S23 based on another, previously set, AF system and advances to step S24.

The other AF system may be, for example, a "face-recognition AF system" in which image recognition is used to detect a position where a face of a subject is located in an image and the AF area is set to the position in the image where the face of a subject appears, a "free AF system" in which the user is allowed to arbitrarily set a position of AF area, and an AF system in which the AF area is previously set at a fixed position.

That is, the metering area 21 in the other AF system is set independently of the metering area in the photometry system set by the user.

At step S24, CPU 10 judges whether or not the shutter button has been operated the full way, based on whether or not an operation signal generated when the shutter button has been operated the full way is sent from the key input unit 11.

When it is determined at step S24 that the shutter button has not been operated the full way (NO at step S24), CPU 10 repeatedly judges at step S24 whether or not the shutter button has been operated the full way until it is determined that the shutter button has been operated the full way. When it is determined at step S24 that the shutter button has been operated the full way (YES at step S24), CPU 10 executes a still-image pick-up/recording process at step S25.

That is, CPU 10 causes CCD 5 to execute a photographing operation (charge storing operation) with the aperture value (f-number) and at the shutter speed determined at step S13, and then the CPU 10 reads out the charges accumulated in the picture elements of CCD 5 to capture the image data. Captured image data is compressed and recorded in the flash memory 15.

In the embodiment described above, in the case where the "multi-area AF system" is set and the coupling of the photometry system with the AF process is turned ON, the number and positions of the AF areas are changed depending on the photometry system set by the user, and therefore the AF system does not focus on a subject other than the subject falling in an area that the user wants to photograph.

For example, when the user selects the photometry system to be the "average metering system", the whole photographed image is considered as the desired target subject. Therefore, the AF process is executed to set plural AF areas of the "multi-area AF system" throughout the whole image produced by CCD 5. Further, when the user selects the "center-weighted metering system", the portion in the vicinity of the middle of the photographed image is considered as the target subject to be photographed. Therefore, the AF process is executed with four AF areas disposed in the vicinity of the middle of the image produced by CCD 5. When the user selects the "spot metering system", the portion the middle of the photographed image is considered as the target subject to be photographed. Therefore, the AF process is executed with one AF area set in the middle of the image produced by CCD 5.

Meanwhile, the user is allowed to select whether the coupling of the photometry system with the AF process is ON or OFF, and when coupling of the photometry system coupled with the AF process is turned OFF while the "multi-area AF system" is selected, the plural AF areas of the "multi-area AF system" are set at the default positions. Therefore, the user can execute the AF process in accordance with the "multi-area AF system" satisfying the photographing condition.

Further, when the user selects another AF system (such as the "face-recognition AF system") other than the "multi-area AF system", the AF process is executed in accordance with the selected AF system independently of the photometry system selected by the user. Therefore, the user can focus on a subject in accordance with the user's desired AF system.

The embodiment of the present invention described above may be modified as follows.

(1) In the embodiment described above, the AF area(s) 23 is/are displayed on the image display unit 16, but the embodiment can be modified such that AF area(s) 23 is/are not always displayed.

(2) In the embodiment described above, when coupling of the photometry system with the AF process is set to be ON, each of the AF area(s) has the same size regardless of the selected photometry system (the "average metering system", "center-weighted metering system", and "spot metering system"). The embodiment of the present invention described above may be modified such that the size of the AF area (area size) is changed in accordance with the selected photometry system. That is, the positions and sizes of AF areas can be changed such that all AF areas fall substantially within the metering area 21 or 22 (for example, the center area, when the "center-weighted metering system" is selected). In addition, the embodiment of the present invention described above may be modified such that each AF area has a different shape.

Figure 8:
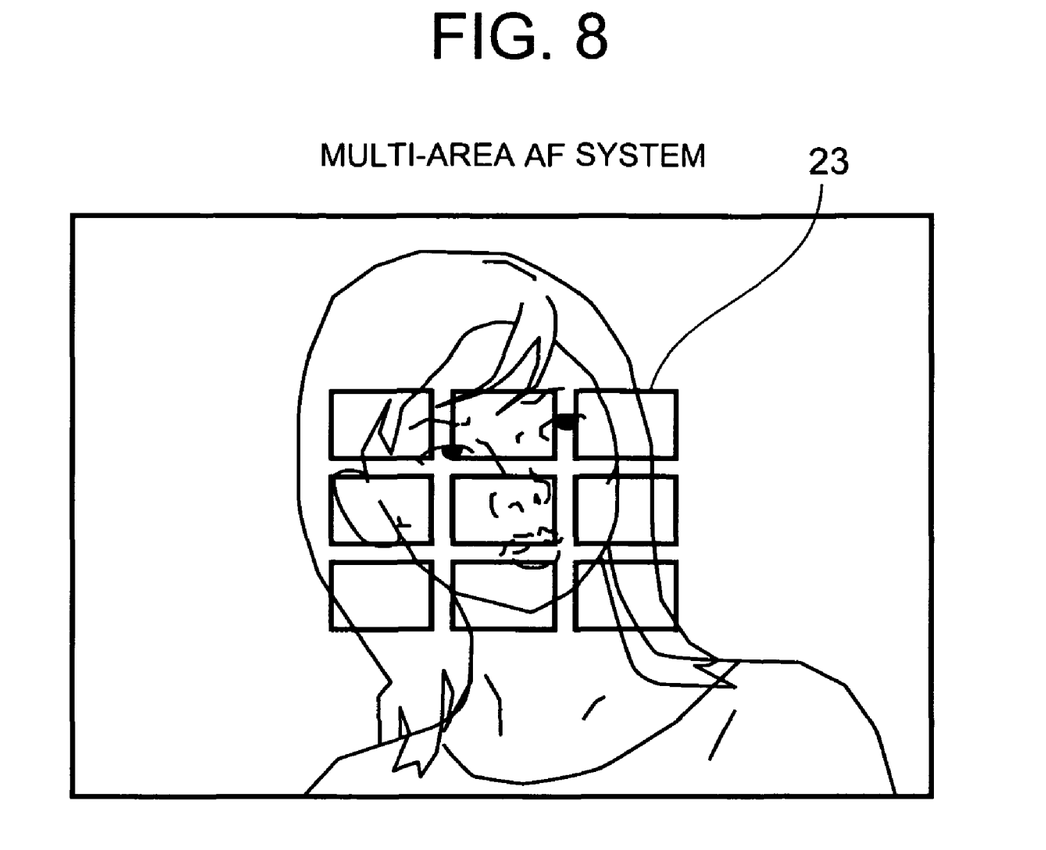
FIG. 8 is a view showing AF areas 23 set for the "center-weighted metering system" when the "multi-area AF system" is selected in a modified embodiment of the invention.

For example, when coupling of the photometry system with the AF process is set to be ON, when the "center-weighted metering system" is selected, the size of each of the AF areas 21 may be reduced instead of reducing the number of AF areas 23, as shown in FIG. 8.

In the embodiment of the present invention described above, the number and positions of the AF areas 23 are changed in accordance with the photometry system selected by the user, but the embodiment described above may be modified such that only one of quantity, position, shape, and size of the AF areas 23 is changed in accordance with the photometry system selected by the user, or such that only the positions and size of the AF areas 23 are changed, or such that only the quantity and size of the AF areas 23 are changed.

Further, at step S21 in FIG. 3, the positions of 9 AF areas 23 are set to the default positions. However, the default settings for the AF areas 23 may include different numbers and sizes of AF areas 23, and a plurality of AF areas 23 may be displayed in accordance with the default values.

(3) The image pick-up apparatus of the invention is not necessarily a digital camera 1. The features of the image pick-up apparatus of the present invention may be used in other apparatuses having an AE function and an AF function, such as a cellular phone with a camera, a PDA with a camera, a personal computer with a camera, an IC recorder with a camera, a digital video camera, and so on.

What is claimed is:

1. An image pick-up apparatus comprising:
    an image pick-up unit which includes a focus lens and which photographs a subject to generate image data;
    a first selecting section which is operable by a user to select a photometry system from among a plurality of photometry systems;
    a second selecting section which is operable by the user to select an auto-focusing system from among a plurality of auto-focusing systems, including a multi-area auto-focusing system;
    an auto-focusing area setting section which, when the multi-area auto-focusing system is selected by the second selecting section, sets at least one auto-focusing area used by the multi-area auto-focusing system to correlate with the photometry system selected by the first selecting section; and
    a detecting section which detects a focus position of the focus lens at which the subject is in focus, based on at least one portion of the image data generated by the image pick-up unit that falls within the at least one auto-focusing area set by the auto-focusing area setting section.

2. The image pick-up apparatus according to claim 1, wherein the auto-focusing area setting section changes at least one of position, size, shape, and quantity of the at least one auto-focusing area to correlate with the photometry system selected by the first selecting section, when the multi-area auto-focusing system is selected by the second selecting section.

3. The image pick-up apparatus according to claim 1, further comprising:
    a metering area setting section which sets a metering area to correlate with the photometry system selected by the first selecting section,
    wherein the auto-focusing area setting section sets the at least one auto-focusing area at least one position corresponding to the metering area set by the metering area setting section, when the multi-area auto-focusing system is selected by the second selecting section.

4. The image pick-up apparatus according to claim 1, wherein:
    the plurality of photometry systems includes an average metering system; and
    the auto-focusing area setting section sets a plurality of auto-focusing areas throughout a whole image of the image data generated by the image pick-up unit, when the average metering system is selected by the first selecting section.

5. The image pick-up apparatus according to claim 4, wherein:

the plurality of photometry systems includes a center-weighted metering system in which photometry is performed by weighting a central portion of the image data with respect to the rest of the image data; and when the center-weighted metering system is selected by the first selecting section, the auto-focusing area setting section decreases the auto-focusing areas in at least one of size and quantity with respect to the auto-focusing areas set when the average metering system is selected, and sets the auto-focusing areas, which have been decreased in at least one of size and quantity, in an area that is substantially equivalent to the center portion.

6. The image pick-up apparatus according to claim 1, wherein:

the plurality of photometry systems includes a spot metering system in which photometry is carried out based on a single spot portion of the image data; and the auto-focusing area setting section sets a single auto-focusing area at a position that is substantially equivalent to the single spot portion, when the spot metering system is selected by the first selecting section.

7. The image pick-up apparatus according to claim 1, wherein, when an auto-focusing system other than the multi-area auto-focusing system is selected by the second selecting section, the auto-focusing area setting section sets the at least one auto-focusing area independently of the photometry system selected by the first selecting section in accordance with the auto-focusing system selected by the second selecting section.

8. The image pick-up apparatus according to claim 7, wherein the plurality of auto-focusing systems includes a face-recognition auto-focusing system in addition to the multi-area auto-focusing system; and wherein when the face-recognition auto-focusing system is selected by the second selecting section, the auto-focusing area setting section recognizes a position of a face of the subject and sets an auto-focusing area at the recognized position.

9. The image pick-up apparatus according to claim 1, further comprising:

a third selecting section which determines whether or not to set the at least one auto-focusing area by the auto-focusing area setting section to correlate with the photometry system selected by the first selecting section, wherein when the second selecting section selects the multi-area auto-focusing system, and the third selecting section determines that the at least one auto-focusing area is to be set by the auto-focusing area setting section to correlate with the selected photometry system, the auto-focusing area setting section sets the at least one auto-focusing area to correlate with the photometry system selected by the first selecting section.

10. The image pick-up apparatus according to claim 9, wherein, when the second selecting section selects the multi-area auto-focusing system, and the third selecting section determines that the at least one auto-focusing area is not to be set by the auto-focusing area setting section to correlate with the selected photometry system, the auto-focusing area setting section sets a plurality of auto-focusing areas for the multi-area auto-focusing system at default positions.

11. The image pick-up apparatus according to claim 1, further comprising:

a lens driving unit which drives the focus lens along an optical axis of the focus lens, wherein the detecting section observes a contrast component of image data falling within the at least one auto-focusing area set by the auto-focusing area setting section while the focus lens is being driven by the lens driving unit, so as to detect a position at which the observed contrast component reaches a maximum as the focus position of the focus lens.

12. The image pick-up apparatus according to claim 1, further comprising:

a lens driving unit which moves the focus lens to the focus position detected by the detecting section.

13. The image pick-up apparatus according to claim 1, further comprising:

a shutter button operable half way and full way for instructing the image pick-up unit to photograph the subject; and a photography controlling section which causes the image pick-up unit to photograph the subject, when the shutter button is operated full way.

14. The image pick-up apparatus according to claim 13, wherein the detecting section comprises an auto-focus controlling section which causes the detecting section to execute an auto-focusing process when the shutter button is operated half way.

15. The image pick-up apparatus according to claim 13, further comprising:

an auto-exposure controlling section which measures light in accordance with the photometry system selected by the first selecting section, when the shutter button is operated half way.

16. The image pick-up apparatus according to claim 1, wherein the first selecting section displays a menu screen to enable the user to select one of the plurality of photometry systems when the user executes a predetermined operation in a stand-by state in which the image pick-up apparatus is waiting for a photographing instruction.

17. The image pick-up apparatus according to claim 1, wherein the second selecting section displays a menu screen to enable the user to select one of the plurality of auto-focusing systems when the user executes a predetermined operation in a stand-by state in which the image pick-up apparatus is waiting for a photographing instruction.

18. A computer readable storage medium having a computer program stored thereon that is executable by an image pick-up apparatus which comprises an image pick-up unit which includes a focus lens and which is operable to photograph a subject to generate image data, the program being executable by the image pick-up apparatus to perform processes comprising:

setting a photometry system selected by a user from among a plurality of photometry systems;

setting an auto-focusing system selected by the user from among a plurality of auto-focusing systems, including a multi-area auto-focusing system;

when the multi-area auto-focusing system is set, setting at least one auto-focusing area used by the multi-area auto-focusing system to correlate with the set photometry system; and detecting a focus position of the focus lens at which the subject is in focus, based on at least one portion of the image data generated by the image pick-up unit that falls within the at least one set auto-focusing area.

19. A method for controlling an image pick-up apparatus which comprises an image pick-up unit which includes a focus lens and which is operable to photograph a subject to generate image data, comprising:

setting a photometry system selected by a user from among a plurality of photometry systems;

setting an auto-focusing system selected by the user from among a plurality of auto-focusing systems, including a multi-area auto-focusing system;

when the multi-area auto-focusing system is set, setting at least one auto-focusing area used by the multi-area auto-focusing system to correlate with the set photometry system; and detecting a focus position of the focus lens at which the subject is in focus, based on at least one portion of the image data generated by the image pick-up unit that falls within the at least one set auto-focusing area.

20. An image pick-up apparatus comprising:

image pick-up means, including a focus lens, for photographing a subject to generate image data;

first selecting means, operable by a user, for selecting a photometry system from among a plurality of photometry systems;

second selecting means, operable by the user, for selecting an auto-focusing system from among a plurality of auto-focusing systems, including a multi-area auto-focusing system;

auto-focusing area setting means for, when the multi-area auto-focusing system is selected by the second selecting means, setting at least one auto-focusing area used by the multi-area auto-focusing system to correlate with the photometry system selected by the first selecting means; and detecting means for detecting a focus position of the focus lens at which the subject is in focus, based on at least one portion of the image data generated by the image pick-up means that falls within the at least one auto-focusing area set by the auto-focusing area setting means.

* * * * *